May 1, 1934.   A. W. WOHLRAB   1,957,189
TABULATING MACHINE
Filed June 17, 1930   2 Sheets-Sheet 2

Inventor
A. W. Wohlrab
By his Attorney
W. M. Wilson

Patented May 1, 1934

1,957,189

UNITED STATES PATENT OFFICE 1,957,189

TABULATING MACHINE

Albert William Wohlrab, Oakland, Calif., assignor, by mesne assignments, to International Business Machines Corporation, New York, N. Y., a corporation of New York Application June 17, 1930, Serial No. 461,734

7 Claims. (Cl. 235—92)

The invention concerns accounting machines and has for its principal object the provision of improved and simplified mechanism for controlling total printing operations.

For the purpose of properly disclosing the invention it will be shown applied to an electrical tabulator of the type disclosed in Patent #1,762,145 issued to Daly and Page, June 10, 1930. Machines of this class are adapted to sense perforations in record cards and add amounts thus received into accumulators. Printing mechanism is also provided so the items accumulated may be separately listed on record sheets. Automatic control mechanism is provided to cause the machine to perform total printing and resetting operations wherein the printing mechanism is controlled by the accumulators to print the totals of the amounts added therein.

The cards run through the machine are usually first sorted into groups and the information is added by groups or sub-groups as desired and the totals printed represent the summation of all the cards in each particular group.

Frequently it is desirable to suppress the printing of totals under control of the accumulators where the group consists of a single card. Since this information has already been listed directly from the card the total printing operation would result in a mere repetition of the same data. This is undesirable in certain classes of work, as for example the making out of bills in connection with the supply of public utilities.

Let us assume that such commodities as gas, water and electricity are supplied to consumers and that for each customer a separate card contains the information relating to each type of service. At stated periods these cards, after having been sorted into groups according to customer's number are to be utilized in making out bills or statements, whereon each item is separately listed following which a total or balance payable is printed under control of the accumulators which have been adding the separate amounts.

Where but a single commodity is furnished this automatic statement issuing operation would ordinarily print the data relating to this one type of service and follow it with a total or balance which in such case is a repetition of the item itself.

It is an object of the invention, therefore, to obviate the printing of totals for card groups composed of single cards. This is achieved by exercising such control over the electric circuits involved in printing amounts under control of the accumulators as to render them ineffective during a total printing cycle.

This in its preferred form is accomplished by setting up a relay during the passage of the first card of a group by the lower brushes. The passage of a second card in the same group will set a second relay device and the combined action of both relays will condition the total printing circuit to be effective during the ultimate total taking cycle of operations. Should a total taking cycle be initiated for a single card group wherein such total taking cycle is initiated upon passage of such single card by the lower brushes, the second relay will not have been set and consequently the total printing circuit is not conditioned to function during the total taking operation.

A modification of the invention may consist in the provision of a relay for preparing the total printing circuit under control of a special perforation in a card, which special card occurs only in groups greater than one.

For example it may be desired to make out bills for a single commodity, say water, and at the time of current billing if customers are in arrears with their payments their cards will still be in the unpaid file. These unpaid cards are gang punched in some predetermined index position of a particular column, and then sorted so as to pair with the card corresponding to the current billing. In this way the entire file of cards to be run through the machine will consist of single cards and pairs of cards, one of which pair has a special punch hole. The sensing of this hole as the cards run through the machine will cause the operation of a relay which in turn renders the total printing circuits effective to print from the accumulators the sum of both cards to indicate the balance due upon the bill.

Further and other objects and advantages will be hereinafter set forth in the accompanying specification and claims, and shown in the drawings, which by way of illustration show what is now considered to be two preferred embodiments of the invention.

Figure 1:
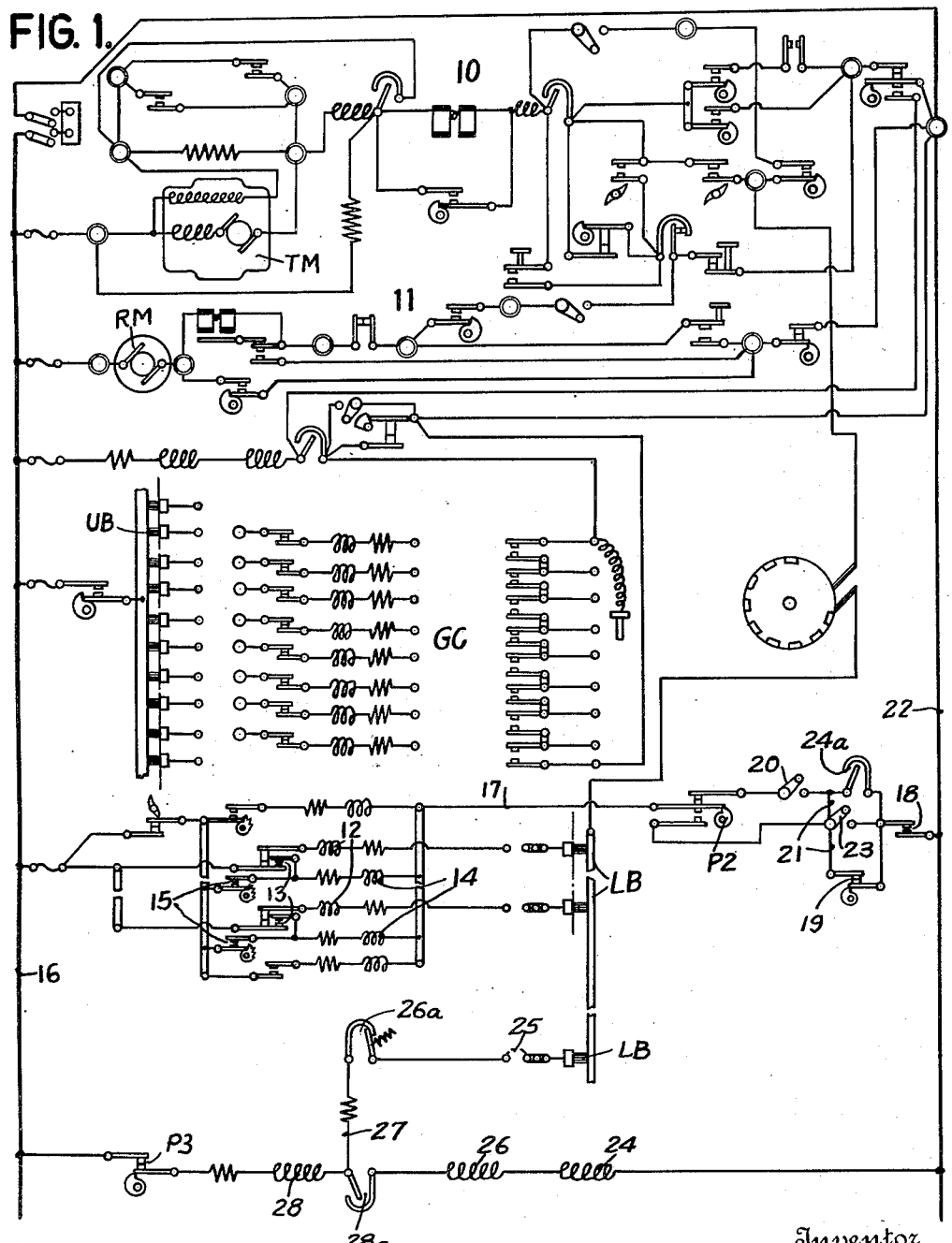
Fig. 1 is a circuit diagram of the complete machine showing the wiring of one form of the invention.

The diagram in Fig. 1 with the exception of the total printing circuit is entirely similar to that shown in the patent to Daly and Page previously referred to. During adding operations the machine is driven by a tabulating motor TM controlled by a group of cam and relay controlled circuits indicated at 10 and is driven during total taking operations by a reset motor RM controlled by a group of circuits, contacts and relays designated generally at 11.

When the tabulating motor TM is in operation it feeds the usual perforated tabulating cards, bearing differentially arranged index points, representing digits, first, beneath the upper analyzing brushes UB and exactly one machine cycle later beneath the lower analyzing brushes LB. By means of group control mechanism generally indicated at GC, groups of cards, as represented in certain selected columns, may be operated upon separately, the items of each group being accumulated and the total of them taken before the machine begins operation on the following card group.

As the perforated cards pass the lower brushes, their index points instantaneously close circuits through the proper lower analyzing brushes LB to energize counter magnets 12. As usual, the timed energizations of these magnets control mechanism for entering the data corresponding to the card reading, on the counter wheels. When any counter magnet 12 is energized it causes contacts 13 to close, energizing a printer magnet 14 to select the type corresponding to the entered data for printing. In this fashion the accumulated items may be listed.

During the operation of the total taking mechanism the magnets 14 may be energized upon closure of the associated stepped-cam contacts 15 which close in synchronism with the positioning of the type bars to indicate the amount contained in the accumulator. Both the adding and total-printing circuits through magnet 14 extend from one side of the line 16 to the contacts 13 or 15 to the printer magnet 14 and thence to a common lead 17. Lead 17 terminates at a contact P 2 which is operated from the total taking devices to close its lower blades during total taking. During listing operations the contact is positioned as shown. A contact 18 is adapted to close whenever the type bars rise to position, either for listing or for total printing.

These functions do not enter specifically into the present invention and will not be described in detail as they are well understood and fully described and explained in the patent previously mentioned.

A cam contact 19 is provided which is controlled by the adding mechanism and is adapted to be closed during the portions of the cycle when listing is being effected. When listing, the circuit from lead 17 passes through the upper contacts of P 2, switch 20 (normally closed to permit listing) wire 21, contacts 19 and 18 to other side of line 22.

Switch 23 is normally open for the purposes of the invention and since during a total taking operation, contact 19 is also open there can be no printing circuit completed through magnets 14 unless relay contacts 24a are closed. The total printing circuit will thereupon follow from lead 17, lower contacts of P 2, wire 21, contacts 24a, contact 18 to line 22. Contact 24a is adapted to close when the total to be printed comprises the accumulation of two or more cards and will remain normally open if a single card group has caused the initiation of the total taking cycle.

Figure 3:
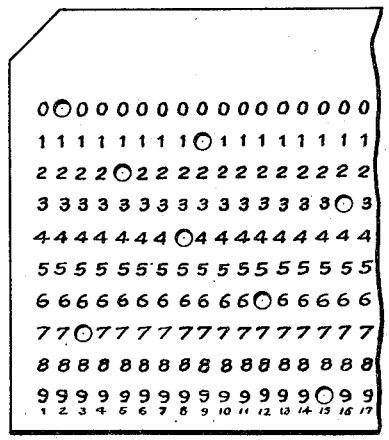
Fig. 3 is a fragment of a Hollerith tabulating card provided with perforations for controlling the operation of the machine.

The closing of contact 24a may be effected under control of a special perforation in a card group having more than one card. This special perforation may be made in any of the index point positions of one of the cards of a multiple card group in any desired column provided the same column is utilized for each group. Such a perforation may be as indicated in Fig. 3, where a perforation such as is made in the "7" index point position of the third column may be used. The circuit through this special perforation will be completed, in the usual manner, during passage of the card beneath the lower brushes to the brush LB of the proper column and by plug wire connection 25 to a normally closed relay contact 26a, wire 27, relay coil 28, contact P 3 to line 16. Contact P 3 is adapted to be closed during listing operations and opens during total taking operations after total printing operations. The foregoing circuit causes energization of coil 28 and the closure of its contacts 28a thereby establishing a circuit from line 16, contact P 3, coil 28, contacts 28a, coils 26 and 24 to line 22. Energization of coil 26 causes its related contact 26a to open thus preventing back circuits to brushes LB, and closure of contacts 28a establishes a holding circuit through its coil 28. Energization of coil 24 will close contacts 24a so that during the ensuing total taking cycle the printing circuits may be completed as heretofore traced. During the total taking cycle and after total printing has been effected, contact P 3 is opened to deenergize coils 24, 26 and 28 restoring the parts to their original relationship. In the case of a single card group, wherein no such special hole is present, total printing will be suppressed due to the open condition of contact 24a.

Figure 2:
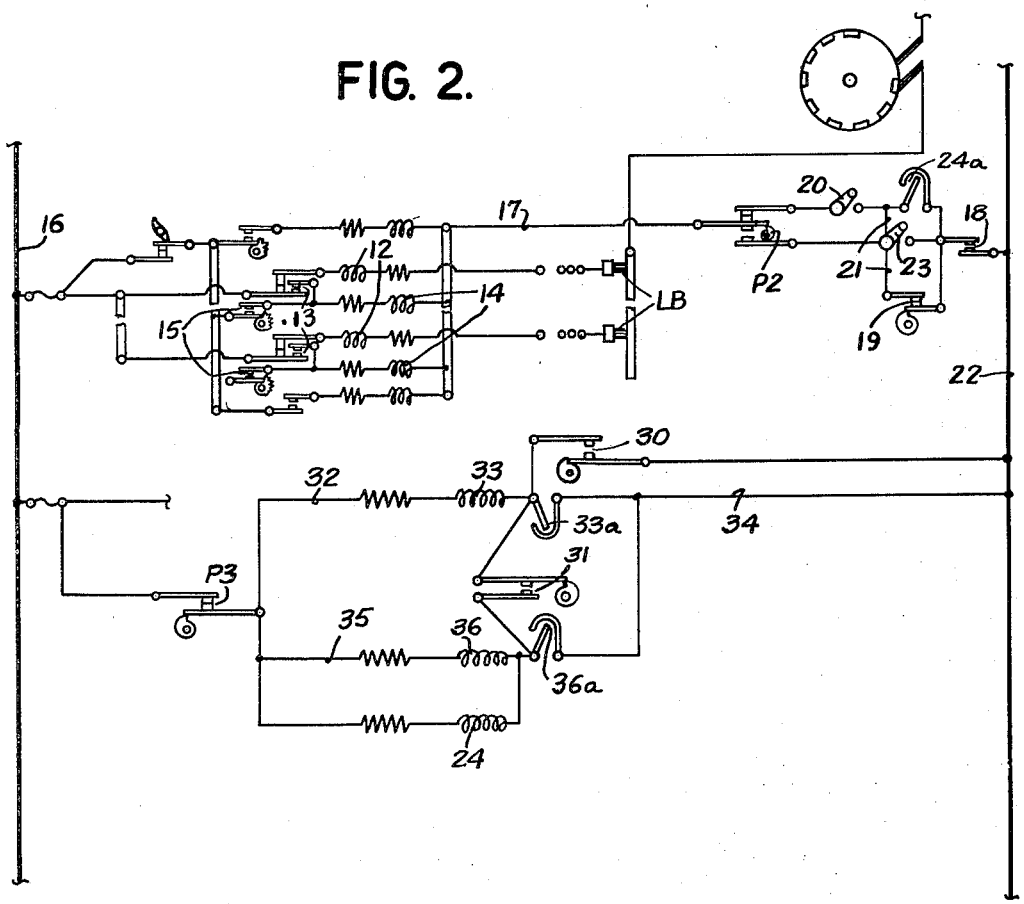
Fig. 2 shows the wiring of a second form.

Another form of relay mechanism for controlling contact 24a is shown in Fig. 2 wherein no special perforation is required and the successive passage of two cards before a total taking operation is initiated by the usual automatic control mechanism will cause the closure of contact 24a. A pair of cam contacts 30 and 31 is provided, operated by the listing mechanism, the one being adapted to close at a point corresponding to the "1" index position on the card and the other being adapted to close at a point corresponding to "9" on the card and open again before the first closes.

If a group contains more than one card, closure of contact 30 during passage of the first card will close a circuit from line 16, contact P 3, wire 32, coil 33, contact 30 to line 22. Coil 33 attracts its contacts 33a to form a holding circuit to line 22 through wire 34. Closure of contact 31 during passage of the second card establishes a circuit from line 16, contact P 3, wire 35, coil 36, contact 31, contact 33a, now closed, wire 34 to line 22. Coil 36 attracts its contacts 36a to form a holding circuit through coil 36 and also coil 24, wired in parallel therewith. This circuit follows from line 16, contact P 3, coils 36 and 24, contact 36a, wire 34 to line 22. Energization of coil 24 closes contacts 24a and total printing can be effected as already explained. During total taking contact P 3 will open to break the holding circuits and permit restoration of the parts.

Where but a single card comprises a group, only contact 33a will be closed when a total taking cycle is initiated, and the open condition of contact 24a will prevent total printing. This is brought about by the fact that during the single card cycle, closure of contacts 31 at the "9" point in the cycle was ineffective to complete a circuit since contacts 30 and 33a were both open at such time and no other path was provided to the right side of line 22. Later in the cycle, specifically at the "1" time, contacts 30 closed and energized relay 33 as traced above, the contacts 31 having opened in the meantime. Since the usual automatic control mechanism initiated a total taking cycle following the analysis of this single card, the machine will perform total taking operations with relay contacts 24a open because the single card cycle preceding the total taking cycle was ineffective to cause closure of contacts 24a.

When it is desired to total print regardless of the number of cards in a group, switch 23 may be closed, short circuiting contacts 24a and 19 so that during any total taking cycle amounts may be printed under control of the accumulators.

While I have shown and described and pointed out the fundamental novel features of the invention as applied to two modifications it will be understood that various omissions and substitutions and changes in the form and details of the device illustrated and in its operation may be made by those skilled in the art without departing from the spirit of the invention. I intend to be limited therefore by the scope of the following claims:

1. In a machine of the class described, accumulating mechanism for accumulating successive items, normally ineffective total printing mechanism for printing totals from said accumulating mechanism and means responsive only to entries of multi-item groups into said accumulating mechanism to effect operation of the total printing mechanism.

2. In a machine of the class described, accumulating mechanism, total printing mechanism controlled thereby, means for suppressing the operation of said total printing mechanism and means responsive to the entries of multi-item groups for rendering said suppressing means ineffective.

3. In a machine of the class described, record analyzing and accumulating mechanism adapted to analyze and accumulate items of successive groups of cards, means for printing the totals of the items for each group, means settable under control of said analyzing mechanism for determining whether more than one card comprises a group, and means controlled by said settable means for controlling the operation of said total printing means.

4. In a machine of the class described, accumulating mechanism for accumulating successive items, mechanism for recording totals from said accumulating mechanism, and means responsive to entries of multi-item groups into said accumulating mechanism to control operation of the recording mechanism.

5. In a machine of the class described, accumulating mechanism for accumulating successive items, total printing mechanism operative at the end of groups of items for printing totals from said accumulating mechanism, controlling circuits for said printing mechanism, and means responsive to the entries of multi-item groups for rendering said circuits effective.

6. In a machine of the class described, adapted to perform adding cycles and total printing cycles of operation, said total printing cycles being adapted to take place with the printing mechanism normally inoperative, automatic control mechanism for causing the operation of a total printing cycle to follow said adding cycles, and means responsive to the operation of more than one adding cycle preceding a total printing cycle for effecting the operation of the printing mechanism during the total printing cycle.

7. In a machine of the class described, adapted to perform adding cycles and total printing cycles of operation, a single total printing cycle being adapted to follow one or more adding cycles in response to the operation of automatic control mechanism, printing mechanisms and circuits therefor adapted to operate during said total printing cycle, a relay device settable in response to the operation of more than one adding cycle, and means controlled by said relay device for rendering said printing mechanism circuits effective.

ALBERT WILLIAM WOHLRAB.